S. G. MONCE.
Glaziers' Tools.

No. 140,426.  Patented July 1, 1873.

Witnesses.
O. D. Warner.
C. A. Shepard.

Inventor
Samuel G Monce
By James Shepard
Atty.

UNITED STATES PATENT OFFICE.

SAMUEL G. MONCE, OF BRISTOL, CONNECTICUT.

IMPROVEMENT IN GLAZIERS' TOOLS.

Specification forming part of Letters Patent No. 140,426, dated July 1, 1873; application filed December 1, 1870.

*To all whom it may concern:*

Be it known that I, SAMUEL G. MONCE, of Bristol, in the county of Hartford and State of Connecticut, have invented a new and Improved Glazier's Tool, of which the following is a specification:

My invention consists of a new article of manufacture, to wit, a rolling steel glass-cutter and a putty-knife united in one common tool, as hereinafter described.

Figure 1:
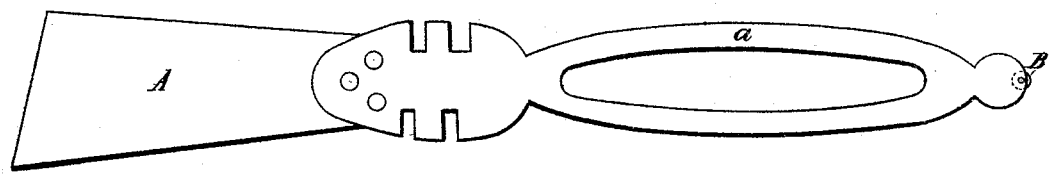
Figure 2:

In the accompanying drawing, Figure 1 is a side elevation of an improved glazier's tool which embodies my invention; and Fig. 2 is an edge view of the same.

A designates the ordinary putty-knife, provided with a handle, $a$, of any desired pattern. B designates the cutting-roller, as patented to myself June 8, 1869, which roller B is pivoted in a slot, $b$, at the end of the handle $a$.

The convenience of this improved implement is apparent, without special explanation.

I claim as my invention—

As a new article of manufacture, the improved glazier's tool herein shown and described, which consists of a rolling steel glass-cutter and a putty-knife united in one common tool, substantially as specified.

SAMUEL G. MONCE.

Witnesses:
JAMES SHEPARD,
C. A. SHEPARD.